May 6, 1958  N. L. JEGLUM  2,833,046
ELECTROMAGNETIC GAGE HEAD
Filed March 26, 1956
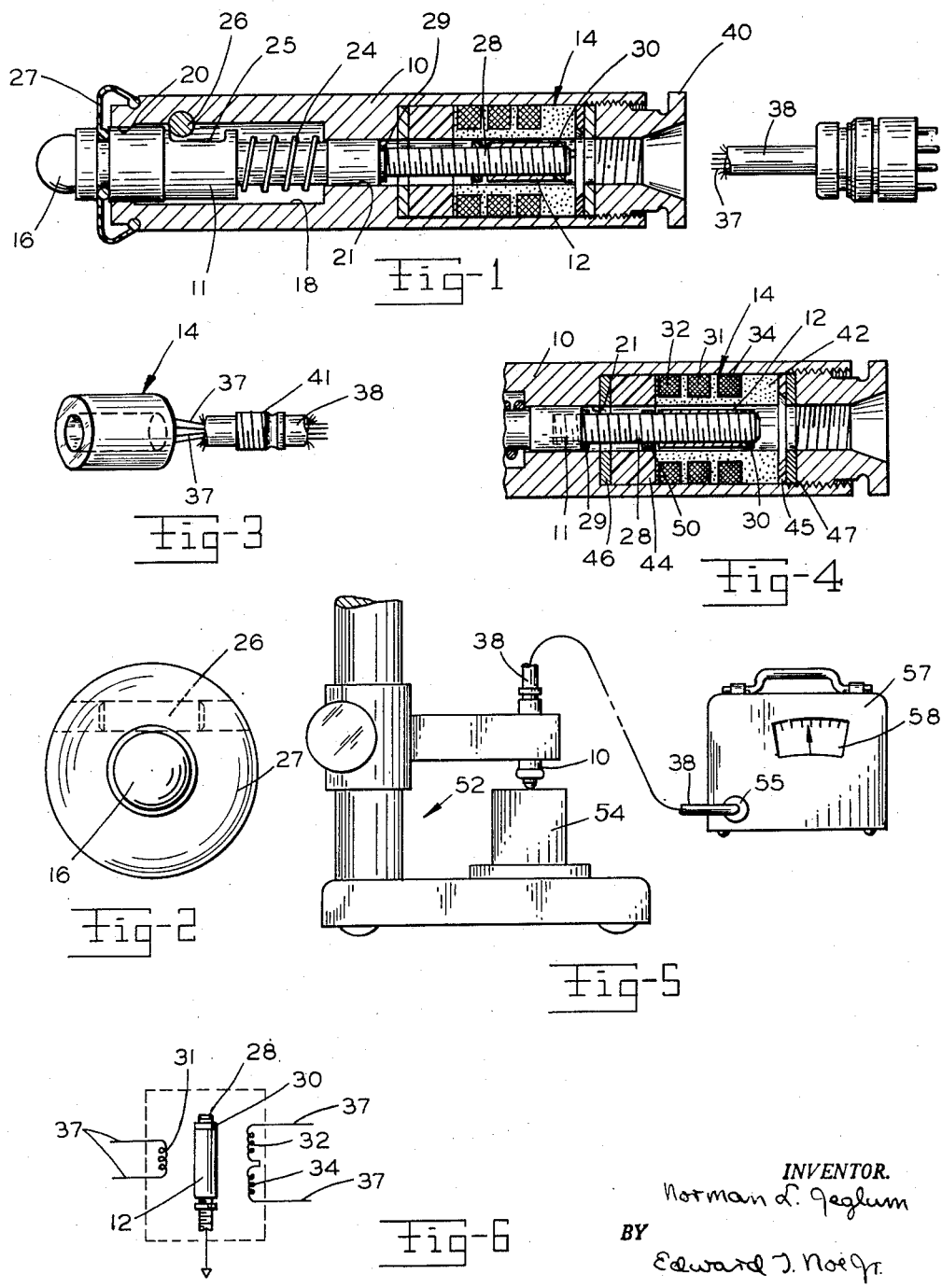
INVENTOR.
Norman L. Jeglum
BY
Edward J. Noe Jr.

United States Patent Office 2,833,046
Patented May 6, 1958

2,833,046

ELECTROMAGNETIC GAGE HEAD

Norman L. Jeglum, Dayton, Ohio, assignor, by mesne assignments, to The Sheffield Corporation, a corporation of Delaware Application March 26, 1956, Serial No. 573,895

10 Claims. (Cl. 33—147)

This invention relates to gaging devices and more particularly to an electric gage head for obtaining electric signals varying in accordance with a gaged product characteristic, machine movements and the like.

It is an object of this invention to provide an electric gage head formed of a few simple parts which are economically assembled and adjusted during manufacture to provide a unit reliable for repeated accurate gaging operations of high precision during a long service life.

It is a further object to provide such a gage head wherein compensating adjustments for unavoidable variations in manufacture are easily made to obtain the desired precision of response.

It is a further object to provide such a gage head wherein a movable plunger positions an armature relative to the coils of a differential transformer, the transformer coils being electrically isolated and symmetrically situated for desired signal response with movements of the armature in either direction from a central position relative thereto.

It is a further object to provide such a gage head wherein compensating means are physically adjustable within the gage head axially of the movable armature to establish a desired electrical null with the armature in a central position and to compensate for coil location and other peculiarities of the head.

Other objects and advantages of the invention will be apparent from the following description, the appended claims, and the accompanying drawing, in which, Figure 1 is a longitudinal central section of a gage head embodying the present invention, Figure 2 is an end view of the head of Figure 1, Figure 3 illustrates the differential transformer unit, Figure 4 is an enlarged section of the differential transformer and its supporting structure, shown with the movable armature centrally located, Figure 5 is an exemplary application of the gage head of this invention, and Figure 6 is a fragmentary electrical diagram showing the basic operation of the head.

The present invention provides a gage head for precision measurement wherein a movable control member is positioned relative to electrical coils in accordance with a gaged condition such as a product dimension or a machine movement. Preferably the control member is a core or armature portion at one end of a work contacting plunger slidable within a gage head body which supports exciter and pick-up coils of a differential transformer coaxially with the movable armature.

In gage heads of a high precision character it is essential that physical relationships be accurately maintained and that electrical characteristics of the finished heads be precisely uniform and consistent. Heretofore electrical balance conditions have been accomplished by adjustment of electrical resistances in external circuits. In the present gage head critical relationships have been minimized, the transformer coils have been effectively isolated within a symmetrical electrical field, and an extremely simple compensating mechanical adjustment has been provided in the gage head to obtain the desired null signal or balance condition with the armature centrally located relative to the coils.

The exemplary gage head illustrated for the purpose of disclosing the features of the present invention comprises an integral body 10 sildably supporting a gaging plunger 11 which positions an armature 12 relative to a differential transformer 14 adjacent the inner end of the head. Plunger 11 in this example has a work contactor 16 projecting beyond the outer end of body 10 for direct engagement with a part to be measured. Movements of armature 12 in either direction from a central location with respect to transformer 14 will provide electrical signals which vary in magnitude with the amount of movement and in sense with the direction thereof. Transformer 14 is connected to a suitable electrical circuit for obtaining an indication of the gaged condition, actuation of segregating mechanism for parts gaged, machine control, or like functions.

Body 10 has a passage 18 which extends therethrough and in which plunger 11 is slidably mounted. Spaced support or bearing surfaces 20 and 21 in body 10 are of limited axial extent and serve to support and guide the plunger and to position armature 12 relative to transformer 14. Because of the limited extent of supporting surfaces 20 and 21 and their relative spacing, critical alignment relationships are minimized and armature 12 is accurately positioned radially with respect to the transformer coils. The diameter of armature 12 is less than that of inner bearing surface 21 and the plunger 11 and armature 12 can be assembled and then mounted in body 10 by insertion through the outer body end, passing armature 12 through bearing surface 21. Transformer 14 has a diameter larger than bearing surface 21 and is mounted by insertion into the other end of body 10.

Spring 24 cooperates between body 10 and plunger 11 urging the plunger in one direction out of the body. Plunger 11 has a groove 25 extending transversely thereacross and a pin 26 supported with a force fit in body 10 cooperates therewith. Pin 26 limits the inward and outward movement of plunger 11 by engagement with the end portions of groove 25. The bottom of groove 25 is flat and the rotation of plunger 11 is limited by engagement of the flat inner surface of groove 25 with the pin. Limiting the rotation of plunger 11 improves accuracy, eliminating any possible variation caused by rotation of aramture 12 within transformer 14. An annular sealing member 27 fitted between body 10 and the outer end of plunger 11 is formed of a suitable plastic material and seals the gage head against the entrance of foreign matter to insure free movement of plunger 11. Figure 2 illustrates an end view of work contactor 16 and seal 27.

Plunger 11 includes a threaded armature shaft portion 28 adjusted and locked in position by nut 29 of brass or the like. Armature 12 is threaded onto armature shaft 28 and is locked in position as by a brass lock nut 30.

Transformer unit 14 is of a commercially available type comprising an exciter coil 31 and output coils 32 and 34 adapted for connection to an amplifier or the like through leads 37 in cable 38. Passage 18 through body 10 is enlarged adjacent the inner end of the gage head to provide a chamber for receiving transformer 14. Washer members are situated at each side of transformer 14 within the chamber and the assembly is held in fixed relationship by a plug 40 threaded at the inner end of the head. A cable connector 41 (see Figure 3) is, in turn, threaded within plug 40.

Exciter coil 31 and output coils 32 and 34 are embedded in an electrically inert substance such as a lava compound or the like indicated at 42 in Figure 4. In commercially available units of this type this inert supporting medium extends for a greater distance to one side of the windings than to the other. It is extremely important that from the null central position of armature 12 the electric or magnetic path be uniform in either direction. For this purpose in the present invention, washers 44 and 45 of a similar inert material such as formica or the like of different thicknesses are inserted at each side of transformer unit 14 to obtain symmetrical electrical characteristics to each side of exciter winding 31. Washer 44 is thicker than washer 45 to make the inert mass at one side of the windings symmetrical with that at the other side. This is important in gaging operations of extremely high precision. Furthermore, complete turns or "shorted" turns, preferably of brass, and indicated at 46 and 47 are provided at each end of the assembly within the body chamber to isolate the transformer and armature system. With balanced characteristics to each side of the central null point and an effective isolation of the electrical portion of the head reliably accurate gaging results can be achieved.

Theoretically, with armature 12 centered relative to windings 31, 32 and 34 a null response or electrical signal will be obtained. However, due to variations in winding location and other peculiarities it is possible that this condition will not occur. In the present invention an extremely simple adjustment has been provided for obtaining the desired null with the armature so situated. A compensating adjustment is provided and in the illustrated example it is formed by a brass nut 50 threaded onto aramture shaft 28. Nut 50 can be threaded along shaft 28 until the desired null is obtained due to its effect upon the magnetic field. Thus possible variations such as the effect of the plunger end on the magnetic field are compensated for in an extremely simple and economical manner and without involving the manipulation or substitution of electrical components in an external circuit. After compensating adjustments, transformer 14 and plug 40 are cemented to body 10 and armature 12 and nuts 30 and 50 to shaft portion 28 to prevent displacement under vibration and other disturbing conditions.

Figure 5 illustrates an exemplary application of the gage head of this invention wherein the gage head is mounted on an arm of a comparator 52 for gaging the dimension of a gage block 54 or the like. Cable 38 has a plug 55 at its outer end inserted into an amplifier cabinet 57 having an indicating dial 58 in this illustrative example.

In Figure 6 armature 12 is shown diagrammatically in association with exciter winding 31 and out-put or pick-up windings 32 and 34. Their leads 37 can be connected to any suitable electrical system for converting the electrical variations obtained into usable signals. A suitable amplifying system is disclosed in detail in application No. 501,602 filed April 15, 1955.

Thus it is seen that a gage head has been provided for extremely precise gaging but which involves few critical relationships. Symmetrical electrical characteristics are obtained and the electrical portions of the head are effectively isolated. An adjustment has been provided to compensate for unavoidable irregularities in a simple and economical manner.

While the form of apparatus herein described constitutes a preferred embodiment of the invention, it is to be understood that the invention is not liimted to this precise form of appartus, and that changes may be made therein without departing from the scope of the invention which is defined in the appended claims.

What is claimed is:

1. An electric gage head for precision measurement of the character described comprising a body member, a differential transformer unit comprising exciter and pick-up coils supported by said body member and adapted for connection to an electric gaging system, an armature carried in said body member for movement relative to said coils to each side of a central position relative thereto to obtain an electric signal varying with the movement and the gaged condition, and a compensating element adjustable to fixed positions relative to said armature to obtain a balanced electrical condition between the exciter coil and each of the pick-up coils with the armature in said central position relative to said coils.

2. An electric gage head for precision measurement of the character described comprising a body, annular gaging coils in said body adapted for connection to an electric system, a gaging plunger carried for endwise movement in said body along the axis of said coils, said plunger having an armature portion movable within said coils to obtain an electric signal varying with the gaged condition, and a compensating member adjustable along said plunger to vary its relationship relative to the armature portion for varying the electrical characteristics of the gage head and obtain a predetermined signal with said armature portion in a reference position relative to said coils.

3. An electric gage head for precision measurement of the character described, comprising an elongated body, a transformer unit in said body adjacent one end thereof and including annular exciter and pick-up coils unsymmetrically situated in the unit and adapted for connection to an electric system, a plunger supported for axial movement in said body having work positioned means at one end thereof projecting beyond the respective end of the body, an armature adjustably mounted on said plunger adjacent the other end thereof for movement relative to said coils during gaging whereby an electric signal is obtained which varies in magnitude and sense with displacement of said armature from a central reference position within the transformer, means cooperating between said body and plunger to limit relative rotation therebetween and maintain the plunger within the body, washer means of different thickness at each end of said transformer to symmetrically locate the transformer coils for obtaining balanced electrical characteristics, and retaining means at the inner end of said body for maintaining said transformer and washer means in fixed relation relative to said body.

4. A gage head as set forth in claim 3 wherein said washer means comprises electrically inert elements adjacent said transformer of different thicknesses at each end thereof for a symmetrical situation of the transformer coils, and closed turns of magnetically inert metallic material at the outer sides thereof whereby the transformer is magnetically isolated.

5. An apparatus as set forth in claim 3 comprising a compensating element on said plunger adjacent said armature and adjustable along said plunger to fixed positions whereby a desired electrical response is obtained with the armature in a reference position relative to said coils.

6. An electric gage head for precision measurement of the character described, comprising an elongated body having a pair of relatively spaced coaxial cylindrical bearing surfaces, the outer bearing surface being situated adjacent the outer end of the body, a plunger in said body slidably supported by engagement with both of said bearing surfaces having a work contactor at its outer end projecting beyond the outer body end and having an armature portion adjacent its inner end movable during gaging along an axial path between the inner body end and the inner bearing surface, the diameter of the armature portion being less than that of the inner bearing surface whereby the plunger and body can be assembled and the armature portion disposed in operating position by insertion from the outer body end by passage through the outer and inner bearing surface, means cooperating between the body and plunger urging the plunger outward and stop surfaces limiting the outward plunger position, an annular differential transformer unit inserted into said body from its inner end having a diameter larger than the inner bearing surface and disposed concentrically about the armature portion of the slidable plunger, and retaining means fixing said unit in the gage head body.

7. An electric gage head for precision measurement of the character described, comprising an elongated body, a plunger axially slidable within said body, said plunger having a work contactor at one end thereof projecting beyond the outer end of said body, a differential transformer unit fixed in said body adjacent its inner end and including exciter and pick-up coils, the inner portion of said plunger being threaded, an armature supported by threading on the inner end of said plunger movable within said transformer unit to obtain electrical signals varying in accordance with the plunger position, spring means cooperating between said plunger and said body, limit means on the plunger and body for retaining said plunger within said body, and a compensating element threaded on said plunger portion adjustable relative to one end of said armature to compensate for preculiarities in the electrical response of said transformer and obtain a reference signal with the armature in a given position within said body.

8. An electric gage head for precision measurement of the character described, comprising an elongated body, a plunger axially slidable within said body having a work contactor at one end projecting beyond the outer end of the body, means urging said plunger outward of said body and limit means cooperating between the body and plunger to restrain plunger movement and rotation, said body having a passage therethrough in which said plunger is slidably carried, said body having a chamber at the inner end thereof formed as an enlarged section of the body passage, a differential transformer unit in said chamber having exciter and pick-up coils, retaining means at the inner end of said body for retaining said unit in a fixed position therein, an armature on said plunger adjacent its inner end movable within said transformer unit whereby an electric signal is obtained which varies in magnitude and sense with the displacements of said armature from a predetermined central position within said transformer, and a compensating element on said plunger adjacent said armature and adjustably positioned relative thereto to obtain a balanced condition between the exciter and each pick-up coil and a desired electrical signal condition with the armature in a central reference position.

9. A gage head as set forth in claim 8 wherein the coils are unsymmetrically located in the transformer unit and further comprising non-magnetic washer inserts of different thicknesses within said chamber at each end of said transformer unit to provide symmetrical electrical characteristics and similar response to armature movement to each side of the central armature position.

10. An electric gage head for precision measurement of dimensions and the like comprising a body, annular gaging coils in said body for connection to an electric gaging system, a gaging plunger carried for endwise movement in said body along the axis of said coils, said plunger having an armature portion movable within said coils to obtain an electric signal varying with the position of the armature relative thereto and the gaged condition, annular means of magnetically and electrically inert material extending equally in each axial direction from said coils for symmetrical characteristics to each side thereof, and shorted turns of non-ferrous metal at the extremities of said annular means to isolate the coil and armature system.

References Cited in the file of this patent
UNITED STATES PATENTS

| | | |
|---|---|---|
| 2,494,579 | Pimlott et al. | Jan. 17, 1950 |
| 2,583,791 | Neff | Jan. 29, 1952 |
| 2,598,467 | Van Yzeren | May 27, 1952 |